United States Patent [19]

Lee et al.

[11] Patent Number: 5,499,242
[45] Date of Patent: Mar. 12, 1996

[54] CIRCUIT FOR DISTRIBUTED COLLISION DETECTION

[75] Inventors: Wesley Lee, San Jose, Calif.; Jerry Grand, Atlanta, Ga.

[73] Assignee: National Semiconductor Corporation, Del.

[21] Appl. No.: 381,183

[22] Filed: Jan. 31, 1995

[51] Int. Cl.$^6$ .................................................. H04L 12/413
[52] U.S. Cl. ...................................... 370/85.3; 370/85.11
[58] Field of Search ........................ 326/52, 105; 327/23; 370/85.1, 85.2, 85.3, 85.9, 85.11

[56] References Cited

U.S. PATENT DOCUMENTS

| | | | |
|---|---|---|---|
| 4,481,626 | 11/1984 | Boggs et al. | 370/85.3 |
| 5,012,467 | 4/1991 | Crane | 370/85.3 |
| 5,345,447 | 9/1994 | Noel | 370/85.3 |
| 5,351,241 | 9/1994 | Yehonatan | 370/85.3 |

OTHER PUBLICATIONS

William Stallings, Ph.D., "Local Networks", Third Edition, Macmillan Publishing Company, 1990, Section 5.3—Medium Access Control—Bus/Tree, pp. 155–165.

*Primary Examiner*—Benedict V. Safourer
*Attorney, Agent, or Firm*—Limbach and Limbach

[57] ABSTRACT

N bit-collision circuits of a collision detection circuit each include a bit-collision circuit driver connected to drive an x-th line of the common collision detection bus if the x-th line of the station's corresponding identifier signal is at a low level. The bits of the identifier signal are only provided to the bit-collision circuit drivers while an enable signal is asserted. The driver has an open-collector-type connection to the x-th line of the common collision detection bus. That is, the bit-collision circuit driver, when not driving, presents a high impedance at its output. Each bit-collision circuit further includes an XOR device for use in comparing the level of the x-th line of the collision bus with the level of the x-th bit of the station's identifier signal. A NOR device is for combining receives the comparison results from the XOR devices of the bit-collision circuits and provides a combined bit-collision result. A global collision indication line driver has an open-collector-type output interface to a global collision indication line. The global collision indication line driver is coupled to receive the local collision result signal. If the local collision result signal has a low level, the global collision indication line driver drives its output onto the global collision indication line. Otherwise, the global collision indication line driver presents a high impedance at its output.

12 Claims, 1 Drawing Sheet

CIRCUIT FOR DISTRIBUTED COLLISION DETECTION

FIELD OF THE INVENTION

The present invention relates to collision detection circuits for use in data processing networks and, in particular, to a collision detection circuit for use in a particular station of a data processing network such that, when the circuit is employed by the stations of the network, collision detection is distributed among the stations.

RELATED ART

Collision detection protocols for detecting simultaneous transmission of data by stations connected to a network are well known in the art. For example, Carrier Sense Multiple Access ("CSMA") collision detection protocols are discussed in *Local Networks, Third Edition*, by William Stallings (Macmillan, 1990), at pp. 155–165). With the CSMA protocol, a transmitting station connected to a network determines that a collision has occurred after transmitting data to a destination station. In particular, the transmitting station waits a predetermined amount of time after transmitting the data to receive an acknowledgement from the destination station that the transmission was received. If the acknowledgement has not been received within the predetermined amount of time, then it is determined that a collision has occurred. In most situations, in the event of a collision, the colliding stations would retransmit the data after some randomly-chosen time period.

Networks which adhere to the emerging 100 Base-T standard, similar to those networks which adhere to the 10 Base-T standard, will employ multi-port repeaters to connect the stations to the network. For a small network (e.g., less than twelve stations), one multi-port repeater, self-contained within a single integrated circuit chip, may be employed. For larger networks, multiple repeater chips are required. When multiple repeater chips are employed, these multiple chips must act in concert as one "logical" repeater, and information must be shared between the chips such that a transmitting stations can detect the occurrence of a collision.

One approach to collision detection is to employ a centralized arbiter which detects network activities from the repeater chips. If two or more repeater chips are active, the centralized arbiter detects this and indicates a collision. One problem with the centralized arbiter approach is that the centralized arbiter is a "single point of failure." That is, should the centralized arbiter fail, or be powered down, all repeater chips, and hence the network, is rendered unusable.

Another problem is that the number of signals required to be provided to and from the centralized arbiter becomes unwieldy as the number of repeater chips increases. In fact, in many of the repeater backplanes in use today, there may not be enough signals available to provide a centralized arbiter function for a large network.

Another collision detection approach involves "daisy chaining" the repeater chips. In particular, one repeater chip is assigned to the top of the chain, and all others are assigned to be below. Each of the repeater chips "lower" in the chain are disabled if any of the chips "above" it detects a collision. While this approach is very efficient in terms of signal pin usage, it also suffers reliability problems in that any one chip can be a "single point of failure". Still another drawback is that all the repeater chips must be connected while the network is active. This precludes "hot swapping" of repeater chips.

SUMMARY OF THE INVENTION

The present invention is a collision detection circuit for use in each station of a data processing network, where the stations of the network are connected to an N-line common collision detection bus. The collision detection bus is not used for transmitting data. The stations are each assigned a corresponding N-bit identifier signal. Collision detection is distributed among the stations. The number of signals required on the repeater backplane is reduced. Any collision detection circuit can be "hot swapped", and no collision detection circuit is a potential "single point of failure" of the network.

A collision detection circuit in accordance with the present invention comprises N bit-collision circuits. Each bit-collision circuit includes a bit-collision circuit driver connected to drive an x-th line of the common collision detection bus if the x-th line of the station's corresponding identifier signal is at a low level. The bits of the identifier signal are only provided to the bit-collision circuit drivers while an enable signal is asserted. Typically, the station would assert the enable signal before transmitting data to determine if a collision would occur if the station transmitted data. Then, the station would keep the enable signal asserted during data transmission to keep other stations from transmitting. The driver has an open-collector-type connection to the x-th line of the common collision detection bus. That is, the bit-collision circuit driver, when not driving, presents a high impedance at its output.

Each bit-collision circuit further includes comparing means for comparing the level of the x-th line of the collision bus with the level of the x-th bit of the station's identifier signal. A combining means receives the comparison results from the comparing means of the bit-collision circuits and provides a combined bit-collision result. A providing means is coupled to receive the combined bit-collision result. The providing means is also coupled to receive the enable signal, delayed, via a delay means. The providing means provides the combined bit-collision result as a local collision result signal responsive to the enable signal, delayed, being asserted.

In accordance with a further embodiment of the invention, a global collision indication line driver has an open-collector-type output interface to a global collision indication line. The global collision indication line driver is coupled to receive the local collision result signal. If the local collision result signal has a low level, the global collision indication line driver drives its output onto the global collision indication line. Otherwise, the global collision indication line driver presents a high impedance at its output.

A better understanding of the features and advantages of the invention will be obtained by reference to the following detailed description and accompanying drawings which set forth an illustrative embodiment in which the principles of the invention are utilized.

DETAILED DESCRIPTION

Figure 1:
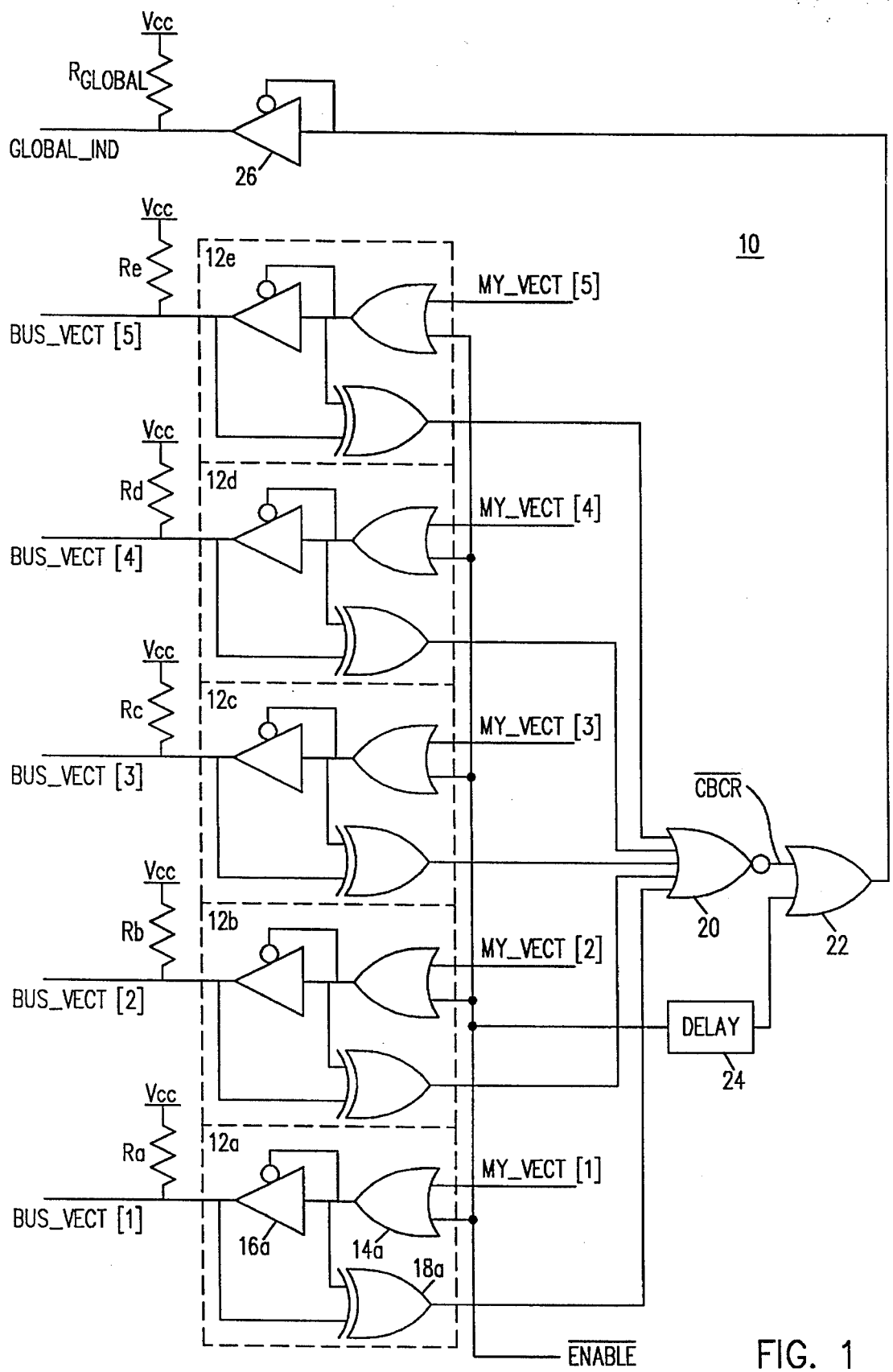
FIG. 1, the sole figure, schematically illustrates a collision detection circuit in accordance with the present invention.

FIG. 1 schematically illustrates a collision detection circuit 10, in accordance with the present invention, for use in each station of a data processing network. The network includes stations which, besides being connected in some fashion for data transmission among the stations, are also connected to an N-line common collision detection bus, BUS_VECT [1 . . . N]. Each station has a corresponding N-bit identifier signal. In the FIG. 1 embodiment, N is equal to five, so the common collision detection bus has five lines, BUS_VECT[1] through BUS_VECT[5].

The collision detection circuit 10 includes five (i.e. N) bit-collision circuits, 12a through 12e. Each bit-collision circuit 12 receives a separate bit of the N-bit identifier signal, MY_VECT. That is, bit-collision circuit 12a receives MY_VECT[1], bit-collision circuit 12b receives MY_VECT[2], etc.

Looking at bit-collision circuit 12a, the output of driver 16a is connected to BUS_VECT[1] and is connected to a voltage rail, $V_{cc}$, via a pullup resistor $R_a$. The interface of the output of driver 16a to BUS_VECT[0] is open-collector type. That is, driver 16a is a type of bus driver that only drives its output low or not at all. Therefore, if none of the collision detection circuits in the stations of the network are driving a particular line of the collision detection bus (e.g., BUS_VECT[1]), then that particular line will be pulled up to the voltage level of $V_{cc}$ by the pullup resistor (e.g., $R_a$). However, if one or more collision detection circuits of the network are driving the line, the line will be driven to be at a low voltage level.

Driver 16a receives MY_VECT[1] via a two-input OR device 14a, gated by an active low ENABLE signal. Specifically, OR device 14a receives MY_VECT[1] at its first input and ENABLE at its second input. Thus, the output of OR device 14a remains high (and, thus, does not drive its output) at all times while ENABLE is not asserted (i.e., is not low). Alternatively, while ENABLE is asserted, the output of OR device 14a tracks MY_VECT[1].

When the output of OR device 14a is high, driver 16a presents a high impedance at its output and, thus, does not affect the state of BUS_VECT[1]. However, when the output of OR device 14a is low, driver 16a is enabled to drives its output low. Due to the open-collector-type interface of driver 16a to BUS_VECT[1], when driver 16a drives its output low, BUS_VECT[1] is pulled low. An XOR device 18a compares the level of the OR device 14a output (i.e. MY_VECT[1], when ENABLE is asserted) with the level of the collision detection bus line BUS_VECT[1]. The result of the comparison by XOR device 18a is provided at the output of XOR device 18a as a bit-collision result signal, BCR[1]. In particular, the level of BCR[1] being high indicates that MY_VECT[1] differs from the level of BUS_VECT[1]. Otherwise, the level of BCR[1] is low.

BCR[1], along with the bit-collision result signals BCR[2] through BCR[5], from XOR devices 18b through 18e, respectively, of the five bit-collision circuits, 12b through 12e, respectively, are received at the inputs of a five-input NOR device 20. NOR device 20 provides a combined bit-collision result signal, CBCR, at its output. In particular, if any of the bit-collision result signals, BCR[x], have a high level, then CBCR has a low level. By contrast, if none of BCR[1] through BCR[5] have a high level, then CBCR has a high level. In limited circumstances, the CBCR signal can be sampled by a station and used to reliably determine if it would cause a collision by transmitting data onto the network.

These limited circumstances can be better understood by examining the behavior of the individual bit-collision circuits 12a through 12e. Table 1, by providing an example of how bit-collision circuit 12a behaves under various conditions, provides some aid in this regard. In Table 1, entries for OTHER_VECT[1] refer to the level of the identifier bit that corresponds to MY_VECT[1] of another station on the network:

TABLE 1

| EXAMPLE OF OPERATION OF BIT-COLLISION CIRCUIT 16a | | | | |
|---|---|---|---|---|
| ENABLE | MY_VECT [1] | OTHER_ VECT[1] | BUS_VECT [1] | BCR[1] |
| 0 | 1 | 0 | 0 | 1 |
| 0 | 1 | 1 or not enabled | 1 | 0 |
| 0 | 0 | don't care | 0 | 0 |

Before examining Table 1, it should be remembered that, even when driver 16a is not driving BUS_VECT[1] low, counterpart drivers of collision detection circuits similar to collision detection circuit 10, in other stations connected to the network, may be driving BUS_VECT[1] low. For simplification, Table 1 has been compiled assuming that there are only two stations connected to the network. Referring now to Table 1, if MY_VECT[1] has a high level (indicated by a "1" in Table 1), then driver 16a presents a high impedance at its output and thus does not pull BUS_VECT[1] low. Thus, if OTHER_VECT[1] has a high level (or is not enabled), BUS_VECT[1] remains at a high level. In this case, the output of XOR device 18a, BCR[1], has a high level.

Alternately, if MY_VECT[1] has a low level (indicated by a "0" in Table 1), then driver 16a drives its output and pulls BUS_VECT[1] low. That is, in this case, and regardless of the level of OTHER_VECT[1], BUS_VECT[1], and thus BCR[1], has a low level. Since the other bit-collision circuits 12b through 12e operate in a manner similar to bit-collision circuit 12a, and all of the BCR[x]'s are combined to generate CBCR, CBCR will not reliably indicate a collision if all of the bits of MY VECT have a low level. That is, in this case, CBCR will never indicate a collision, even where one exists. Furthermore, even if not all of the bits of MY_VECT have a low level, CBCR still will not reliably indicate a collision with the station whose identifier is OTHER VECT if OTHER VECT differs from MY_VECT only in bits that have a low level in MY_VECT and a high level in OTHER_VECT.

However, in all cases where a stations' identifier relative to other stations' identifiers is such that the stations' CBCR will not reliably indicate a collision, the other, colliding, stations' CBCR's will always reliably indicate the collision. Thus, the limited utility of CBCR for indicating a collision in some circumstances can be addressed by allowing the collision detection circuits in each station access to the other stations' CBCR's for collision determination. In this way, station identifiers can be assigned freely, as long as each station is assigned a unique identifier.

For example, referring again to FIG. 1, a driver 26 receives CBCR via a two-input OR device 22, gated by the active low ENABLE signal, delayed by a delay device 24. The delay device may be, for example, a number of inverters coupled in series. Delay device 24 is employed for the purpose of allowing CBCR to settle before it is sampled by driver 26. Disregarding the effect of delay device 24, the output of OR device 22 remains high (and, thus, does not drive its output) at all times while ENABLE is not asserted (i.e., is not low). Alternatively, while ENABLE is asserted, the output of OR device 22 tracks CBCR. Driver 26 has an open-collector-type output interface to a global collision indication line, GLOBAL_IND. That is, driver 26 drives its output low when CBCR is low and, otherwise, driver 26 presents a high impedance at its output. GLOBAL_IND is connected to the voltage rail $V_{CC}$ via a pullup resistor $R_{GLOBAL}$. Since the collision detection circuits of all of the stations' of the network are connected in a similar fashion to GLOBAL_IND, GLOBAL_IND provides a reliable indication of a collision even where CBCR may not.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A collision detection circuit for use with each one of a plurality of stations' of a data processing network, the plurality of stations' connected to an n-line common collision detection bus (n≧2), each one of said plurality of stations' having a corresponding n-bit identifier, the collision detection circuit comprising:

a) n bit-collision circuits, each bit-collision circuit including
      i) a two-input OR device having a first input coupled to receive an active-low enable signal and a second input coupled to receive an x-th line (1≦≦n) of the n-bit identifier corresponding to the station with which the collision detection circuit is to be used;
      ii) a bit-collision circuit driver having an input coupled to receive a signal from an output of said two-input OR device, to drive a bit-collision circuit driver output at a logical low signal level when said signal output from said two-input OR device is logical low, and to otherwise present a high impedance at said bit-collision circuit driver output, said bit-collision circuit driver output adapted to have an open-collector-type connection to an x-th line of the common collision detection bus; and
      iii) a two-input XOR device having a first input coupled to receive said x-th bit of the corresponding n-bit identifier, a second input coupled to said bit-collision circuit driver output and an output that provides a bit-collision result signal; and
   b) an n-input NOR device, each of said n inputs coupled to receive a bit-collision result signal from a separate one of said n bit-collision detection circuits and to generate a combined bit-collision signal responsive thereto.

2. The collision detection circuit of claim 1, further comprising a two-input global OR device having a first input coupled to receive a signal output from said n-input NOR device, a second input coupled to receive said active-low enable signal and an output from which a local collision result signal is provided.

3. The collision detection circuit of claim 2 and further comprising a global collision indication line driver coupled to receive said local collision result signal, to drive an output of said global indication line driver with a logical low signal when said local collision result signal is logical low, and to otherwise present a high impedance at said global indication line driver output, said global collision indication line driver output adapted to have an open-collector-type connection to a global collision indication line.

4. The collision detection circuit of claim 2 and further comprising delay means, wherein said second input of said two-input global OR device is coupled to receive said active-low enable signal via said delay means.

5. The collision detection circuit of claim 4 and further comprising a global collision indication line driver coupled to receive said local collision result signal, to drive an output of said global indication line driver with a logical low signal when said local collision result signal is logical low, and to otherwise present a high impedance at said global indication line driver output, said global collision indication line driver output adapted to have an open-collector-type connection to a global collision indication line.

6. A collision detection circuit for use with each one of a plurality of stations' of a data processing network, plurality of stations' connected to an n-line common collision detection bus (n≧2), each station having a corresponding n-bit identifier, the collision detection circuit comprising:

a) n bit-collision circuits, each bit collision circuit including
      i) a bit-collision circuit driver having an input coupled to receive an x-th bit of the n-bit identifier of the station with which the collision detection circuit is to be used, the bit-collision circuit driver having an output connected to drive an x-th line of said common collision detection bus when said x-th bit of said n-bit identifier is at a first level and to otherwise present a high impedance at the bit-collision circuit driver output; and
      ii) comparing means for comparing said level of said x-th line of said common collision detection bus with said level of said x-th bit of said n-bit identifier and providing a bit-collision result signal responsive thereto; and
   b) combining means for receiving and combining the bit-collision result signals provided by the comparing means of said n bit-collision circuits and to generated a combined bit-collision result signal responsive thereto.

7. A collision detection circuit as in claim 6 and wherein each bit-collision circuit further includes enable means, wherein said x-th bit of said n-bit identifier is provided to said bit-collision circuit driver via said enable means responsive to an assertion of an enable signal.

8. A collision detection circuit as in claim 6 and further comprising providing means for receiving said combined bit-collision result and providing said combined bit-collision result as a local collision result signal.

9. A collision detection circuit as in claim 7 and wherein said providing means is coupled to also receive an enable signal and wherein said providing means provides said combined bit-collision result signal as a local collision result signal responsive to said enable signal being asserted.

10. A collision detection circuit as in claim 8 and further comprising a global collision indication line driver, coupled to receive said local collision result signal, to drive an output of said global indicator line driver when said local collision result signal has a first level and to otherwise present a high impedance at said driver output, said global collision indication line driver output adapted to have an open-collector-type connection to a global collision indication line.

11. A collision detection circuit as in claim 9, wherein the enable signal is asserted when it has a logic low value and wherein said providing means includes a 2-input logic OR device coupled to receive said combined bit-collision result signal at a first input and the enable signal at a second input, and adapted to provide the local collision result signal at an output.

12. A collision detection circuit as in claim 11, wherein said providing means further includes delay means, wherein said 2-input logic OR device receives said enable signal at said input via said delay means.

* * * * *

UNITED STATES PATENT AND TRADEMARK OFFICE
CERTIFICATE OF CORRECTION

PATENT NO.  : 5,499,242
DATED       : March 12, 1996
INVENTOR(S) : Wesley Lee, et al.

It is certified that error appears in the above-indentified patent and that said Letters Patent is hereby corrected as shown below:

In Col. 5, line 19, delete "stations'" and replace with --stations--.
In Col. 5, line 20, delete "stations'" and replace with --stations--.
In Col. 5, line 22, delete "stations'" and replace with --stations--.
In Col. 5, line 28, delete "$(1 \leq \leq n)$" and replace with --$(1 \leq x \leq n)$--.
In Col. 6, line 10, delete "stations'" and replace with --stations--.
In Col. 6, line 11, delete "stations'" and replace with --stations--.

Signed and Sealed this

Eighteenth Day of June, 1996

Attest:

BRUCE LEHMAN

Attesting Officer

Commissioner of Patents and Trademarks